United States Patent [19]
Venham et al.

[11] Patent Number: 5,951,911
[45] Date of Patent: Sep. 14, 1999

[54] LOW VISCOSITY ETHYLENICALLY UNSATURATED POLYURETHANES CONTAINING ALLOPHANATE GROUPS

[75] Inventors: Lanny D. Venham, Paden City; Arthur W. Mason, Sisterville; Michael K. Jeffries, Pine Grove, all of W. Va.; Michael J. Dvorchak, Monroeville, Pa.

[73] Assignee: Bayer Corporation, Pittsburgh, Pa.

[21] Appl. No.: 09/005,272

[22] Filed: Jan. 9, 1998

Related U.S. Application Data

[62] Division of application No. 08/826,262, Mar. 27, 1997, Pat. No. 5,739,251.

[51] Int. Cl.$^6$ .................................................... C08G 18/81
[52] U.S. Cl. ...................... 252/182.2; 560/115; 560/158; 560/330; 560/345; 560/355; 560/357
[58] Field of Search ........................................ 560/345, 330, 560/355, 115, 158, 357; 252/182.2

[56] References Cited

U.S. PATENT DOCUMENTS

| | | | |
|---|---|---|---|
| 4,160,080 | 7/1979 | Köenig et al. | 528/59 |
| 4,810,820 | 3/1989 | Slack et al. | 560/27 |
| 5,124,427 | 6/1992 | Potter et al. | 528/67 |
| 5,128,432 | 7/1992 | Meixner et al. | 528/49 |
| 5,136,009 | 8/1992 | Meixner et al. | 528/49 |
| 5,208,334 | 5/1993 | Potter et al. | 544/193 |
| 5,235,018 | 8/1993 | Potter et al. | 528/49 |
| 5,300,615 | 4/1994 | Meixner et al. | 528/49 |
| 5,459,214 | 10/1995 | Brahm et al. | 526/301 |
| 5,580,947 | 12/1996 | Brahm et al. | 528/75 |
| 5,672,736 | 9/1997 | Brahm et al. | 560/345 |

FOREIGN PATENT DOCUMENTS

| | | |
|---|---|---|
| 2142214 | 8/1995 | Canada . |
| 566037 | 10/1993 | European Pat. Off. . |
| 0 683 189 | 11/1995 | European Pat. Off. . |
| 195 34 162 | 3/1997 | Germany . |
| 994890 | 6/1965 | United Kingdom . |

*Primary Examiner*—Rachel Gorr
*Attorney, Agent, or Firm*—Joseph C. Gil; Thomas W. Roy

[57] ABSTRACT

The present invention relates to ethylenically unsaturated polyurethanes which are substantially free from isocyanate groups and have a) a content of $\beta,\gamma$-ethylenically unsaturated ether groups (calculated as C=C, MW 24) incorporated through allophanate groups of 0.5 to 10% by weight, b) an allophanate group content (calculated as $N_2C_2HO_3$, MW 101) of 1 to 20% by weight and c) a total content of ethylenically unsaturated groups of (calculated as C=C, MW 24) of 1 to 15% by weight.

The present invention also relates to ethylenically unsaturated polyisocyanates which contain allophanate groups and have i) an NCO content of 5 to 25% by weight, ii) a content of $\beta,\gamma$-ethylenically unsaturated ether groups (calculated as C=C, MW 24) incorporated through allophanate groups of 0.5 to 15% by weight and iii) an allophanate group content (calculated as $N_2C_2HO_3$, MW 101) of 1 to 30%.

Finally, the present invention relates to one-component coating compositions containing the ethylenically unsaturated polyurethanes according to the invention.

5 Claims, No Drawings

LOW VISCOSITY ETHYLENICALLY UNSATURATED POLYURETHANES CONTAINING ALLOPHANATE GROUPS

This application is a divisional application of application Ser. No. 08/826,262 filed Mar. 27, 1997, now U.S. Pat. No. 5,739,251.

BACKGROUND OF THE INVENTION

1. Field of the Invention

This present invention relates to ethylenically unsaturated polyurethanes containing allophanate groups, to unsaturated, isocyanate group-containing precursors of these polyurethanes and to the use of the polyurethanes as binders in one-component coating compositions.

2. Description of the Prior Art

Aliphatic polyurethanes that contain acryloyl groups are known and described in U.S. Pat. Nos. 5,125,432, 5,136,009 and 5,300,615 and in DE-A 4,404,616. U.S. Pat. No. 5,125, 432 is directed to the preparation of liquid urethane acrylates from monomeric diisocyanates, such as HDI or IPDI. To avoid the formation of solid products, it is necessary react the monomeric diisocyanate with a mixture of hydroxy acrylates, a mono-functional alcohol containing ester groups (such as trimethylolpropane (TMP) diacetate or diacrylate, which may optionally be alkoxylated) and a saturated, polyhydric alcohol such as TMP.

U.S. Pat. No. 5,136,009 is directed to the preparation of urethane acrylates from trimethyl-HDI by reacting this diisocyanate with a mixture of hydroxy acrylates and saturated, polyhydric alcohols such as TMP. U.S. Pat. No. 5,300,615 discloses that the urethane acrylates from U.S. Pat. No. 5,125,432 become turbid at less than 10° C. This problem is overcome by reacting a mixture of HDI and IPDI with a mixture of hydroxy acrylates, an alkoxylated mono-functional alcohol containing ester groups (such as TMP diacetate or diacrylate, which is alkoxylated), a branched, saturated, mono or dihydric alcohol and optionally a linear, saturated mono or dihydric alcohol.

DE-A 4,404,616 is directed to a coating composition for polycarbonate which contains the reaction product of a low viscosity polyisocyanate, such as a low viscosity HDI trimer, with a hydroxy acrylate. The composition also contains a bis-acrylate as a reactive diluent.

A disadvantage of the compositions described in the U.S. patents is that they are too viscous for use in solvent-free, one-component coating compositions. Attempts to lower the viscosity by directly reacting monomeric diisocyanates, such as HDI or IPDI, with hydroxy acrylates results in the formation of solid products. Attempts to use low viscosity polyisocyanates, such the HDI trimer described in the German publication, also results in the formation of the solid products in the absence of the reactive diluent.

Accordingly, it is an object of the present invention to provide ethylenically unsaturated polyurethanes which do not suffer from the disadvantages of the prior art. It is an additional object of the present invention to provide ethylenically unsaturated polyurethanes that are suitable for use as binders for one-component coating compositions and have an acceptably low viscosity without the need for organic solvents and reactive diluents that are regulated environmentally objectionable and regulated by the government.

These objects may be achieved with the ethylenically unsaturated polyurethanes according to the present invention, which are described in detail hereinafter. The polyurethanes are derived from ethylenically unsaturated polyisocyanates containing allophanate groups.

Polyisocyanates containing allophanate groups have been described in U.S. Pat. Nos. 4,160,080 and 4,810,820 and in British Patent 994,890. Although ethylenically unsaturated alcohols are included in lengthy lists of suitable alcohol starting materials, there is no indication that these unsaturated alcohols could be used to prepare ethylenically unsaturated polyurethanes that satisfy the objectives of the present invention.

U.S. Pat. Nos. 5,459,214 and 5,580,947 are directed to ethylenically unsaturated isocyanates which may be used as binders in one-component coating compositions. However, these polyisocyanates do not contain allophanate groups as required by the present invention. The allophanate polyisocyanates described in U.S. Pat. Nos. 5,124,427, 5,208,334 and 5,235,018 and in EP-A-0,566,037 are not based on unsaturated alcohols and are recommended as crosslinking agents for two-component coating compositions.

SUMMARY OF THE INVENTION

The present invention relates to ethylenically unsaturated polyurethanes which are substantially free from isocyanate groups and have a) a content of $\beta,\gamma$-ethylenically unsaturated ether groups (calculated as C=C, MW 24) incorporated through allophanate groups of 0.5 to 10% by weight, b) an allophanate group content (calculated as $N_2C_2HO_3$, MW 101) of 1 to 20% by weight and c) a total content of ethylenically unsaturated groups of (calculated as C=C, MW 24) of 1 to 15% by weight.

The present invention also relates to ethylenically unsaturated polyisocyanates which contain allophanate groups and have i) an NCO content of 5 to 25% by weight, ii) a content of $\beta,\gamma$-ethylenically unsaturated ether groups (calculated as C=C, MW 24) incorporated through allophanate groups of 0.5 to 15% by weight and iii) an allophanate group content (calculated as $N_2C_2HO_3$, MW 101) of 1 to 30%.

DETAILED DESCRIPTION OF THE INVENTION

The ethylenically unsaturated polyisocyanates are prepared in a one or two step process by 1) preparing a compound containing urethane groups and optionally isocyanate groups U by reacting at an NCO:OH equivalent ratio of 1:1 to 120:1
   A1) a polyisocyanate component having an NCO content of 20 to 56% by weight and an average NCO functionality of 1.8 to 2.5 and containing one or more organic polyisocyanates with
   B) an alcohol component having an average hydroxyl functionality of 1.0 to 1.8 and containing
      B1) 50 to 100% by weight, based on the weight of alcohol component B), of one or more ether alcohols containing at least one $\beta,\gamma$-ethylenically unsaturated ether group and
      B2) 0 to 50% by weight, based on the weight of alcohol component B) of a saturated alcohol component containing one or more saturated mono-functional or polyfunctional alcohols having a molecular weight of 32 to 500, 2) reacting the compound U prepared in 1) with
   A2) a polyisocyanate component having an NCO content of 20 to 56% by weight and an average NCO functionality of 1.8 to 2.5 and containing one or more organic polyisocyanates,
   at an equivalent ratio of isocyanate groups of component A2) to urethane groups of compound U of at least 3:1 and optionally in the presence of catalysts which accelerate the reaction of urethane groups with isocyanate groups to form allophanate groups and
3) optionally removing at least a portion of excess, unreacted starting polyisocyanates by distillation.

The polyisocyanate component to be used as starting component A1) in the process according to the invention has an NCO content of 20 to 60% by weight, preferably 20 to 50% by weight, and an average NCO functionality of 1.8 to 2.5, preferably 2. Polyisocyanate component A1) is preferably selected from aliphatic or cycloaliphatic diisocyanates, such as 1,4-diisocyanatobutane, 1,5-diisocyanatopentane, 1,6-diisocyanatohexane (HDI), 1,11-diisocyanatoundecane, 1,12-diisocyanatododecane, 2,2,4- and 2,4,4-trimethyl-1,6-diisocyanatohexane, 1-isocyanato-3,3,5-trimethyl-5-isocyanatomethyl cyclohexane (IPDI), 1,3-diisocyanatocyclobutane, 1,3- and 1,4-diisocyanatocyclohexane, 4,4'-bis-(isocyanatocyclohexyl)-methane (HMDI), 1,2-bis-(isocyanatomethyl)-cyclobutane, 1,3- and 1,4-bis-(isocyanatomethyl)-cyclohexane, hexahydro-2,4- and/or -2,6-diisocyanatotoluene, bis-isocyanatomethyl norbornane (isomer mixture), 2,5- and 2,6-bis-(isocyanatomethyl)-bicyclo[2.2.1]heptane, 1-isocyanato-4(3)-isocyanatomethyl-1-methyl cyclohexane, p-xylylene diisocyanate, 2,3-bis-(8-isocyanatooctyl)-4octyl-5-hexyl cyclohexane and mixtures thereof.

Component A1) may also contain modification products of the preceding diisocyanates containing biuret, uretdione, isocyanurate, allophanate and/or carbodiimide groups, provided that the average functionality of component A1) is within the previously disclosed range. Monofunctional isocyanates may also be used to obtain special properties, although their use is not preferred.

Preferably, component A1) is selected from IPDI, HMDI and aliphatic diisocyanates such as HDI; more preferably HDI is used as component A1).

Polyisocyanate component A2) is an organic polyisocyanate or polyisocyanate mixture selected from the suitable polyisocyanates previously set forth for use as polyisocyanate component A1). The distinction between polyisocyanates A1) and polyisocyanates A2) is necessary because, even though both polyisocyanates are selected from the same polyisocyanates, polyisocyanate component A2) does not have to be the same as polyisocyanate component A1). Polyisocyanate component A2) is either the excess of starting polyisocyanate A1) present in the reaction mixture after urethane formation from components A1) and B), or an additional polyisocyanate—added after urethane formation—which may differ from the polyisocyanate A1). Depending upon the NCO/OH equivalent ratio used to prepare compound U, the different polyisocyanate component A2) may either be present alone or in admixture with excess starting polyisocyanate A1).

50 to 100%, preferably 80 to 100% and more preferably 100%, of alcohol component B) is made up of β,γ-ethylenically unsaturated ether alcohols B1) and optionally up to 50%, preferably up to 20%, by weight of saturated alcohols B2). Alcohol component B) has an average hydroxyl functionality of 1 to 1.8, preferably 1 to 1.2 and more preferably 1.

Ethylenically unsaturated alcohol component B1) is selected from β,γ-unsaturated ether alcohols, preferably those having 5 to 14 carbon atoms. These unsaturated ether alcohols contain at least one and preferably at least two β,γ-ethylenically unsaturated ether groups corresponding to the formula

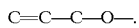

Examples of these ether alcohols include allyl alcohol, glycerol diallyl ether, trimethylol propane diallyl ether and pentaerythritol triallyl ether. Trimethylol propane diallyl ether and allyl alcohol are preferred.

The ethylenically unsaturated alcohol component B1) may also contain ether- or ester-functional alkoxylation products of the previously described ethylenically unsaturated ether alcohols, provided that such alkoxylation products satisfy the requirements of component B). The use of such alkoxylation products is less preferred.

Optional alcohol component B2) is selected from saturated alcohols having a molecular weight of 32 to 500, preferably 32 to 300. Suitable monoalcohols have been disclosed in U.S. Pat. Nos. 5,124,427, 5,208,334 and 5,235,018, the disclosures of which are herein incorporated by reference Examples of suitable monoalcohols include methanol, ethanol, n-propanol, isopropanol, methoxypropanol, the isomeric butanols, pentanols and hexanols, n-heptanol, n-octanol, n-nonanol, n-decanol, n-dodecanol, n-octadecanol, saturated fatty alcohols and mixtures thereof. Suitable polyhydric alcohols include ethylene glycol, propane-1,2- and -1,3-diol, butane-1,4- and -1,3-diol, hexane-1,6-diol, octane-1,8-diol, nonane-1,9-diol, decane-1,10-diol, dodecane-1,12-diol, octadecane-1,18-diol, neopentyl glycol, 1,4-bis-hydroxymethyl cyclohexane, 2-methylpropane-1,3-diol, 2,2,4-trimethyl-pentane-1,3-diol, 2-ethylhexane-1,3-diol, glycerol, trimethylol propane, trimethylol ethane, the isomeric hexanetriols, pentaerythritol, sorbitol and mixtures of these saturated alcohols.

The process according to the invention may be carried out by reacting components A1) and B) at an NCO/OH equivalent ratio of 1:1 to 120:1, preferably 4:1 to 120:1, more preferably 6:1 to 60:1 and most preferably 8:1 to 30:1 in either a one or two step process to initially form urethane groups and subsequently the products according to the invention containing allophanate groups. This reaction generally takes place at a temperature of 30 to 200° C. and preferably at a temperature of 50 to 160° C., the temperature gradually being increased within these ranges. Known catalysts for accelerating the allophanatization reaction between urethane and isocyanate groups are preferably used at least during the allophanatization portion of the reaction.

Suitable catalysts include triethylamine, tributylamine, N,N,N'N'-tetramethylbutyl-1,4-diamine, bis(dimethylamino)ethyl ether, dimethyl ethanolamine, 1,4-diaza-bicyclo[2,2,2]octane, diazobicycloundecene, N,N-dimethylbenzylamine, 1- and 2-methyl imidazole, tris(dimethylaminomethyl)-phenol, pyridine, Mannich bases, morpholines, tetraalkylammonium hydroxides, trimethyl benzylammonium hydroxide and alkali metal hydroxides (such as sodium hydroxide), alkali metal phenolates, metal salts (such as iron(III) chloride, potassium octoate, aluminum tri(ethylacetoacetate), zinc acetyl acetonate and zinc octoate), tin compounds (such as tin(II) octoate, tin(II) ethylhexanoate, tin(II) laurate, dibutyl tin oxide, dibutyl tin dichloride, dibutyl tin diacetate, dibutyl tin dilaurate, dibutyl tin maleate and dioctyl tin diacetate) and mineral acids (such as sulfuric acid, hydrochloric acid, phosphoric acid and perchloric acid). These catalysts are generally used in quantities of 0 to 5% by weight, based on the reaction mixture.

The reaction according to the invention may also be carried out in two stages by initially reacting components A1) and B) in a preliminary reaction at temperatures of up to 120° C. to form the corresponding products containing urethane groups, followed by allophanatization at elevated temperatures of up to 200° C., preferably up to 160° C.

In the one step process polyisocyanate component A2) corresponds to the excess of unreacted starting polyisocyanate A1), which is still present after urethanization reaction. In accordance with the two step process it is possible, although not necessary, to use a mixture of unreacted excess starting polyisocyanate A1) and an additional starting polyisocyanate added after urethanization as polyisocyanate component A2). An example of this procedure is to carry out the urethanization reaction using IPDI and then to add HDI to the reaction mixture as an additional diisocyanate after urethanization and before allophanatization.

After preparation of the polyisocyanates containing allophanate groups, it is preferred, although not necessary to remove a portion of the excess distillable starting diisocyanate by distillation, preferably by thin-layer distillation. After removal the monomer content should be less than 15% by weight, preferably less than 5% by weight, more preferably less than 2% by weight and most preferably less than 0.5% by weight.

The ethylenically unsaturated polyisocyanates containing allophanate groups have
 a) an NCO content of 5 to 25%, preferably 6 to 20% and more preferably 7 to 16% by weight,
 b) an allophanate group content (calculated as $N_2C_2HO_3$, MW 101) of 1 to 30%, preferably 5 to 30% by weight and
 c) a total content of $\beta,\gamma$-ethylenically unsaturated groups of (calculated as C=C, MW 24) of 0.5 to 15%, preferably 3 to 12% by weight.

The ethylenically unsaturated polyurethanes according to the invention are prepared by reacting the corresponding polyisocyanates with hydroxy-functional, ethylenically unsaturated compounds, preferably with (meth)acrylates and/or $\beta,\gamma$-ethylenically unsaturated ether alcohols B1) and more preferably with hydroxy (meth)acrylates. The choice of unsaturated alcohol depends in part upon the curing mechanism that will subsequently be used, i.e., curing with ultraviolet light (UV) or an electron beam, curing at elevated temperatures in the presence of peroxides or azo compounds, or curing under ambient conditions with metal siccatives in the presence of oxygen or peroxides.

Hydroxy (meth)acrylates are preferred when the polyurethanes are cured by ultraviolet light or with an electron beam. It is necessary for allyl ether groups to be present when the coatings are cured under ambient conditions in the presence of metal siccatives because hydroxy (meth)acrylates can only be cured with UV or an electron beam, or at elevated temperatures. However, since allyl ether groups have previously been incorporated via allophanate groups, it is not necessary to use them to react with the isocyanate groups during this step. This is because once the allyl ether groups have been initiated, they can react with the other types of hydroxy-functional ethylenically unsaturated compounds, such as the hydroxy (meth)acrylates.

Accordingly, 0 to 100%, preferably 50 to 100%, more preferably 80 to 100% and most preferably 100% of the isocyanate groups present in the ethylenically unsaturated polyisocyanates should be reacted with hydroxy (meth)acrylates. The remainder of the isocyanate groups are reacted with other hydroxy-functional ethylenically unsaturated compounds, such as $\beta,\gamma$-ethylenically unsaturated ether alcohols B1).

Examples of suitable hydroxy-functional, preferably monohydroxy-functional, ethylenically unsaturated compounds include hydroxyalkyl esters of acrylic or methacrylic acid containing 1 to 8 carbons in the alkyl group, such as the 2-hydroxyethyl, 2-hydroxypropyl, and 2-, 3- or 4-hydroxybutyl esters of the acrylic or methacrylic acid; hydroxyalkyl vinyl ethers such as 2-hydroxyethyl vinyl ether and 4-hydroxybutyl vinyl ether; reaction products of (meth)acrylic acids with monoepoxide compounds; addition products of 1 or more moles of $\epsilon$-caprolactone with 1 mole of the hydroxyalkyl (meth)acrylic esters; and alkoxylation products of these hydroxyalkyl (meth)acrylic esters, preferably with propylene or ethylene oxide, more preferably with propylene oxide.

The properties of the unsaturated polyurethanes can be modified by the choice of the unsaturated alcohol. For example, polyisocyanates reacted with hydroxyalkyl (meth)acrylates will result in harder coatings than polyisocyanates modified with addition products of $\epsilon$-caprolactone and hydroxyalkyl (meth)acrylic esters or with alkoxylation products of these hydroxyalkyl (meth)acrylic esters.

The ethylenically unsaturated polyurethanes according to the invention are substantially free from isocyanate groups and have
 a) a content of $\beta,\gamma$-ethylenically unsaturated ether groups (calculated as C=C, MW 24) incorporated through allophanate groups of 0.5 to 10%, preferably 2 to 10% and more preferably 2 to 8% by weight,
 b) an allophanate group content (calculated as $N_2C_2HO_3$, MW 101) of 1 to 20%, preferably 3 to 15% by weight and
 c) a total content of ethylenically unsaturated groups of (calculated as C=C, MW 24) of 1 to 20%, preferably 3 to 15% by weight.

The ethylenically unsaturated polyurethanes generally have a viscosity at 25° C. of less than 200,000 mPa·s, preferably less than 100,000 mPa·s, more preferably less than 50,000 mPa·s and most preferably less than 20,000 mPa·s. Preferably, these viscosities are obtained for the neat resins, i.e., in the absence of solvents or copolymerizable monomers.

Prior to their use in coating compositions the ethylenically unsaturated polyurethanes may be blended with known additives. Examples of these additives include wetting agents, flow control agents, antiskinning agents, antifoaming agents, matting agents, (such as silica, aluminum silicates and high-boiling waxes), viscosity regulators, pigments, dyes, UV absorbers and stabilizers against thermal and oxidative degradation.

Other additives include organic solvents and/or copolymerizable monomers, preferably copolymerizable monomers. Examples of suitable solvents include those known from polyurethane coating technology such as toluene, xylene, cyclohexane, butyl acetate, ethyl acetate, ethyl glycol acetate, methoxypropyl acetate (MPA), acetone, methyl ethyl ketone and mixtures thereof.

Copolymerizable monomers are selected from organic compounds which contain at least one copolymerizable olefinic double bond, preferably 2 or more double bonds, and preferably have a viscosity of not more than 1000, more preferably not more than 500 mPa·s at 23° C., such as di- and polyacrylates and di- and polymethacrylates of glycols having 2 to 6 carbon atoms and polyols having 3 to 4 hydroxyl groups and 3 to 6 carbon atoms.

Examples include ethylene glycol diacrylate, propane 1,3-diol diacrylate, butane 1,4-diol diacrylate, hexane 1,6-diol diacrylate, trimethylolpropane triacrylate, pentaerythritol tri- and tetraacrylate, and the corresponding methacrylates. Also suitable are di(meth)acrylates of polyether glycols of initiated with ethylene glycol, propane 1,3-diol, butane 1,4-diol; triacrylates of the reaction products of 1 mole of trimethylolpropane with 2.5 to 5 moles of ethylene oxide and/or propylene oxide; and tri- and tetraacrylates of the reaction products of 1 mole of pentaerythritol with 3 to 6 moles of ethylene oxide and/or propylene oxide. Other copolymerizable monomers include aromatic vinyl compounds such as styrene; vinyl alkyl ethers such as vinylbutyl ether or triethylene glycol divinyl ether; and allyl compounds such as triallylisocyanurate. Preferably, the copolymerizable monomers have functionalities of two or more.

The inert solvents and copolymerizable monomers are present in amounts of up to 200% by weight, preferably up to 100% by weight and more preferably up to 20% by weight, based on resin solids.

The coating compositions may be used to coat substrates of any kind, such as wood, plastics, leather, paper, textiles, glass, ceramics, plaster, masonry, metals and concrete. They may be applied by standard methods, such as spray coating, spread coating, flood coating, casting, dip coating, roll coating. The coating compositions may be clear or pigmented lacquers.

After the evaporation of any inert solvents used, the coatings may be crosslinked either by high-energy radiation, such as UV light, electron beams or γ rays, by heating to elevated temperatures in the presence of peroxides or azo compounds, or by curing with metal salts of siccative acids and optionally (hydro)peroxides at either elevated temperatures or at temperatures of room temperature or below.

When the coatings are crosslinked by UV irradiation, photoinitiators are added to the coating composition. Suitable photoinitiators are known and include those described in the book by J. Korsar entitled "Light-Sensitive Systems", J. Wiley & Sons, New York—London—Sydney, 1976, and in Houben-Weyl, Methoden der organischen Chemie, Volume E 20, page 80 et seq, Georg Thieme Verlag, Stuttgart, 1987.

Particularly suitable photoinitiators include benzoin ethers such as benzoin isopropyl ether, benzil ketals such as benzil dimethylketal, and hydroxyalkyl phenones such as 1-phenyl-2-hydroxy-2-methylpropan-1-one. The photoinitiators may be added in amounts, depending upon the application, of 0.1 to 10%, preferably 0.1 to 5% by weight, based on the weight of the ethylenically unsaturated polyurethanes and any other copolymerizable monomers. The photoinitiators may be added individually or may be used as mixtures to obtain advantageous synergistic effects.

To cure the coating compositions at elevated temperatures, curing must be conducted in the presence of 0.1 to 10%, preferably 0.1 to 5% by weight, based on the weight of the ethylenically unsaturated polyurethanes, of initiators such as peroxides or azo compounds. Temperatures of 80 to 240° C., preferably 120 to 160° C., are needed to cure the coating compositions at elevated temperatures.

Suitable initiators include the known free-radical initiators, e.g., aliphatic azo compounds such as azodiisobutyronitrile, azo-bis-2-methylvaleronitrile, 1,1'-azo-bis-1-cyclohexanenitrile and alkyl 2,2'-azo-bis-isobutyrates; symmetrical diacyl peroxides such as acetyl, propionyl or butyryl peroxide, benzoyl peroxides substituted by bromo, nitro, methyl or methoxy groups, and lauryl peroxides; symmetrical peroxydicarbonates such as diethyl, diisopropyl, dicyclohexyl and dibenzoyl peroxydicarbonate; tert-butyl peroxy-2-ethylhexanoate and tert-butyl perbenzoate; hydroperoxides such as tert-butyl hydroperoxide and cumene hydroperoxide; and dialkyl peroxides such as dicumyl peroxide, tert-butyl cumyl peroxide or ditert-butyl peroxide.

The coating compositions according to the invention may also be cured at room temperature in the presence of siccatives and optionally (hydro)peroxides. Suitable siccatives are known and include metal salts, preferably cobalt or vanadium salts, of acids such as linseed oil fatty acids, tall oil fatty acids and soybean oil fatty acids; resinic acids such as abietic acid and naphthenic acid; acetic acid; isooctanoic acid; and inorganic acids such as hydrochloric acid and sulfuric acid. Cobalt and vanadium compounds which are soluble in the coating compositions and act as siccatives are particularly suitable and include salts of the acids mentioned above and also commercial products such as "Vanadiumbeschleuniger VN-2 (Vanadium Accelerator VN-2)" marketed by Akzo. The siccatives are generally used in the form of organic solutions in quantities such that the metal content is 0.0005 to 1.0% by weight, preferably 0.001 to 0.5% by weight, based on the weight of the ethylenically unsaturated polyurethanes.

Examples of (hydro)peroxides include di-tert.-butyl peroxide, benzoyl peroxide, cyclohexanone peroxide, methyl ethyl ketone peroxide, acetyl acetone peroxide, dinonyl peroxide, bis-(4-tert.-butylcyclohexyl)-peroxydicarbonate, tert.-butyl hydroperoxide, cumene hydroperoxide, 2,5-dimethyl-hexane-2,5-hydroperoxide and diisopropyl benzene monohydroperoxide. The (hydro) peroxides are preferably used in quantities of 1 to 10% by weight, based on the weight of the ethylenically unsaturated polyurethanes.

When cured in the presence of cobalt and peroxides, the coating compositions generally cure over a period of 1 to 24 hours at 20° C. to form high-quality coatings. However, curing may also take place at lower temperatures (for example −5° C.) or more quickly at higher temperatures of up to 130° C.

The following examples and comparison examples are intended to illustrate the invention without limiting it in any way. All quantities in "parts" and "%" are by weight unless otherwise indicated.

EXAMPLES

Example 1

Preparation of an Ethylenically Unsaturated Polyisocyanate 100 parts of 1,6-hexamethylene diisocyanate were introduced into a nitrogen-purged stirred reactor, followed by the additon at 25° C. of 31.9 parts of trimethylolpropane diallylether and 0.09%, based on the weight of the reactants, of stannous octoate. The reaction temperature was increased to 100° C. for the allophanitization reaction and maintained at that temperature for about 5 hours until an NCO content of 26.2% was reached. The excess diisocyanate was then removed under vacuum (100 mtorr) in a wiped film evaporator at a temperature of 160° C. The resulting product had the following properties:

| | |
|---|---|
| NCO content: | 13.06% |
| Viscosity (25° C.): | 1610 mPa · s |
| free HDI content: | 0.25% |
| Allophanate group content: | ~18% (calculated) |
| β,γ-ethylenically unsaturated group content (C=C, MW 24): | ~8.7% (calculated) |

Example 2

Preparation of an Ethylenically Unsaturated Polyisocyanate

An ethylenically unsaturated polyisocyanate was prepared from 100 parts of 4,4'-bis-(isocyanatocyclohexyl)- methane (HMDI) and 5.5 parts of allyl alcohol following the procedure of Example 1. The allophanitization reaction was continued until an NCO content of 22.7% was reached. After stripping to remove excess diisocyanate, the resulting product had the following properties:

| | |
|---|---|
| NCO content: | 12.9% |
| Viscosity (50° C.): | >50,000 mPa · s |
| free HMDI content: | 12.0% |
| Allophanate group content: | 15% (calculated) |
| β,γ-ethylenically unsaturated group content (C=C, MW 24): | 3.6% (calculated) |

Example 3

Preparation of an Ethylenically Unsaturated Polyisocyanate

An ethylenically unsaturated polyisocyanate was prepared from 100 parts of 4,4'-bis-(isocyanatocyclohexyl)-methane (HMDI) and 18.56 parts of a propoxylated allyl alcohol having an equivalent weight 146 following the procedure of Example 1. The resulting product, which was not stripped to remove excess diisocyanate, had the following properties:

| | |
|---|---|
| NCO content: | 18.6% |
| Allophanate group content: | 10.8% (calculated) |
| β,γ-ethylenically unsaturated group content (C=C, MW 24): | 2.5% (calculated) |

Example 4

Preparation of an Ethylenically Unsaturated Polyisocyanate

An ethylenically unsaturated polyisocyanate was prepared from 100 parts of 4,4'-bis-(isocyanatocyclohexyl)-methane (HMDI) and 27.2 parts of trimethylol propane diallyl ether following the procedure of Example 1. The resulting product, which was not stripped to remove unreacted diisocyanate, had the following properties:

| | |
|---|---|
| NCO content: | 16.5% |
| Viscosity (25° C.): | 21,100 mPa · s |
| free HMDI content: | ~30% |
| Allophanate group content: | ~10% (calculated) |
| β,γ-ethylenically unsaturated group content (C=C, MW 24): | 4.8% (calculated) |

Example 5

Preparation of an Ethylenically Unsaturated Polyisocyanate

An ethylenically unsaturated polyisocyanate was prepared from 100 parts of 4,4'-bis-(isocyanatocyclohexyl)-methane (HMDI) and 7.38 parts of allyl alcohol following the procedure of Example 1. The resulting products which was not stripped to remove unreacted diisocyanate, had the following properties:

| | |
|---|---|
| NCO content: | 20.48% |
| free HMDI content: | ~30% |
| Allophanate group content: | 11.9% (calculated) |
| β,γ-ethylenically unsaturated group content (C=C MW 24): | 2.8% (calcutated) |

Example 6

Preparation of an Ethylenically Unsaturated Polyurethane

A round bottomed flask was charged with one equivalent of the ethylenically unsaturated polyisocyanate from Example 1 and 0.01%, based on the weight of the final product, of dibutyltin dilaurate. The flask was equipped with an overhead stirrer, nitrogen inlet, thermocouple, temperature controller, heating mantle and condenser. One equivalent of an ester-modified, ethylenically unsaturated monoalcohol (the addition product of 2 moles of ε-caprolactone onto 1 mole of the hydroxyethyl acrylate, MW 344, Tone M-100, Union Carbide) was then incrementally added to the stirred flask under a nitrogen blanket such that the temperature did not exceed 60° C. After the addition was complete the temperature was maintained at 60° C. for two hours until the isocyanate content was less than 0.5% by weight as determined by titration. A urethane acrylate was obtained having the following properties:

| | |
|---|---|
| Viscosity (25° C.): | 18,100 mPa · s |
| Allophanate group content: | 8.7% (calculated) |
| β,γ-ethylenically unsaturated group content (C=C, MW 24): | 4.2% (calculated) |
| Total ethylenically unsaturated group content (C=C, MW 24): | 7.8% (calculated) |

Example 7

Preparation of an Ethylenically Unsaturated Polyurethane

An ethylenically unsaturated polyurethane was prepared following the procedure of Example 6 from one equivalent of the ethylenically unsaturated polyisocyanate from Example 1 and one equivalent of hydroxyethyl acrylate. A urethane acrylate was obtained having the following properties:

| | |
|---|---|
| Viscosity (25° C.): | 12,700 mPa · s |
| Allophanate group content: | 13.2% (calculated) |
| β,γ-ethylenically unsaturated group content (C=C, MW 24): | 6.4% (calculated) |
| Total ethylenically unsaturated group content (C=C, MW 24): | 11.9% (calculated) |

Example 8

Preparation of an Ethylenically Unsaturated Polyurethane

An ethylenically unsaturated polyurethane was prepared following the procedure of Example 6 from one equivalent of the ethylenically unsaturated polyisocyanate from Example 1 and one equivalent of hydroxyethyl methacrylate. A urethane acrylate was obtained having the following properties:

| | |
|---|---|
| Viscosity (25° C.): | 11,700 mPa · s |
| Allophanate group content: | 12.8% (calculated) |
| β,γ-ethylenically unsaturated group content (C=C, MW 24): | 6.2% (calculated) |
| Total ethylenically unsaturated group content (C=C, MW 24): | 11.5% (calculated) |

Example 9

Preparation of an Ethylenically Unsaturated Polyurethane

An ethylenically unsaturated polyurethane was prepared following the procedure of Example 6 from one equivalent of the ethylenically unsaturated polyisocyanate from Example 2 and one equivalent of the ester-modified, ethylenically unsaturated monoalcohol described in Example 6. A urethane acrylate was obtained having the following properties:

| | |
|---|---|
| Viscosity (25° C.) as a 75% solution in a 3:1 mixture of butyl acetate and xylene: | 858 mPa · s |
| Allophanate group content, based on solids: | 7.3% (calculated) |
| β,γ-ethylenically unsaturated group content (C=C, MW 24), based on solids: | 1.8% (calculated) |
| Total ethylenically unsaturated group content (C=C, MW 24), based on solids: | 5.4% (calculated) |

Example 10

Preparation of an Ethylenically Unsaturated Polyurethane

An ethylenically unsaturated polyurethane was prepared following the procedure of Example 6 from one equivalent of the ethylenically unsaturated polyisocyanate from Example 3 and one equivalent of the ester-modified, ethylenically unsaturated monoalcohol described in Example 6. A urethane acrylate was obtained having the following properties:

| | |
|---|---|
| Viscosity (25° C.) as a 77% solution in a 1:1 mixture of butyl acetate and xylene: | 315 mPa · s |
| Allophanate group content, based on solids: | 4.3% (calculated) |
| β,γ-ethylenically unsaturated group content (C=C, MW 24), based on solids: | 1.0% (calculated) |
| Total ethylenically unsaturated group content (C=C, MW 24), based on solids: | 5.2% (calculated) |

Example 11

Preparation of an Ethylenically Unsaturated Polyurethane

An ethylenically unsaturated polyurethane was prepared following the procedure of Example 6 from one equivalent of the ethylenically unsaturated polyisocyanate from Example 4 and one equivalent of the ester-modified, ethylenically unsaturated monoalcohol described in Example 6. A urethane acrylate was obtained having the following properties:

| | |
|---|---|
| Viscosity (25° C.): | 95,400 mPa · s |
| Allophanate group content: | 4.3% (calculated) |
| β,γ-ethylenically unsaturated group content (C=C, MW 24): | 2.0% (calculated) |
| Total ethylenically unsaturated group content (C=C, MW 24): | 6.0% (calculated) |

Example 12

Preparation of an Ethylenically Unsaturated Polyurethane

An ethylenically unsaturated polyurethane was prepared following the procedure of Example 6 from one equivalent of the ethylenically unsaturated polyisocyanate from Example 5 and one equivalent of hydroxyethyl acrylate. A urethane acrylate was obtained having the following properties:

| | |
|---|---|
| Allophanate group content: | 7.6% (calculated) |
| β,γ-ethylenically unsaturated group content (C=C, MW 24): | 1.8% (calculated) |
| Total ethylenically unsaturated group content (C=C, MW 24): | 9.2% (calculated) |

Example 13

Preparation of an Ethylenically Unsaturated Polyurethane

An ethylenically unsaturated polyurethane was prepared following the procedure of Example 6 from one equivalent of the ethylenically unsaturated polyisocyanate from Example 5 and one equivalent of hydroxyethyl methacrylate. A urethane acrylate was obtained having the following properties:

| | |
|---|---|
| Allophanate group content: | 7.3% (calculated) |
| β,γ-ethylenically unsaturated group content (C=C, MW 24): | 1.7% (calculated) |
| Total ethylenically unsaturated group content (C=C, MW 24): | 8.8% (calculated) |

Example 14

Preparation of an Ethylenically Unsaturated Polyurethane

An ethylenically unsaturated polyurethane was prepared following the procedure of Example 6 from one equivalent of the ethylenically unsaturated polyisocyanate from Example 4 and one equivalent of hydroxyethyl acrylate. A urethane acrylate was obtained having the following properties:

| | |
|---|---|
| Allophanate group content: | 6.9% (calculated) |
| β,γ-ethylenically unsaturated group content (C=C, MW 24): | 3.3% (calculated) |
| Total ethylenically unsaturated group content (C=C, MW 24): | 9.5% (calculated) |

Example 15

Preparation of an Ethylenically Unsaturated Polyurethane

An ethylenically unsaturated polyurethane was prepared following the procedure of Example 6 from one equivalent of the ethylenically unsaturated polyisocyanate from Example 4 and one equivalent of hydroxyethyl methacrylate. A urethane acrylate was obtained having the following properties:

| | |
|---|---|
| Allophanate group content: | 6.6% (calculated) |
| β,γ-ethylenically unsaturated group content (C=C, MW 24): | 3.2% (calculated) |
| Total ethylenically unsaturated group content (C=C, MW 24): | 9.4% (calculated) |

Examples 16–19

Coatings Prepared from the Unsaturated Polyurethanes

Coatings were prepared from unsaturated polyurethanes of Examples 6–9 using one of the following formulations:

Formulation 1: 80 parts of unsaturated polyurethane
  16 parts of trimethylolpropane triacrylate
  4 parts of 2-hydroxy-2-methyl-1-phenylpropan-1-one (Darocur 1173, available from Ciba-Geigy)

Formulation 2: 35 parts of unsaturated polyurethane
  15 parts of trimethylolpropane triacrylate
  50 parts of tripropylene glycol diacrylate
  2 parts of 2-hydroxy-2-methyl-1-phenylpropan-1-one (Darocur 1173, available from Ciba-Geigy)
  2 parts of a mixture of 1-hydroxyl cyclohexyl phenyl ketone and benzophone (Irgacure 500, available from Ciba-Geigy)

The formulations were drawn down onto glass panels at a wet film thickness of 3 mils and UV cured by passing under a 300 watt bulbs at a height of 15 cm. Formulation 1 was cured in 2 passes at a speed of 2 m/min, which corresponded to ~2000 mJ/cm². Formulation 2 was cured in 1 pass at a speed of 3.7 m/min, which corresponded to ~1100 mJ/cm². The unsaturated polyurethane, formulation and pendulum hardness are set forth in the following table:

| Example | Unsaturated Polyurethane from Example | Formulation | Pendulum Hardness after 7 days (sec) |
|---|---|---|---|
| 16 | 6 | 1 | 101 |
| 17 | 7 | 1 | 158 |
| 18 | 8 | 1 | 160 |
| 19 | 9 | 2 | 120 |

Examples 20–23

Coatings Prepared from the Unsaturated Polyurethanes

Coatings were prepared from unsaturated polyurethanes of Examples 12–15 using the following formulation:

Formulation: 80 parts of unsaturated polyurethane
  16 parts of trimethylolpropane triacrylate
  4 parts of 2-hydroxy-2-methyl-1-phenylpropan-1-one (Darocur 1173, available from Ciba-Geigy)

The formulations were drawn down onto glass panels at a wet film thickness of 3 mils and UV cured by passing under a 300 watt bulbs at a height of 15 cm. The formulation was cured in 1 or 2 passes at a speed of 2 m/min, which corresponded to ~1000 and ~2000 mJ/cm², respectively. The unsaturated polyurethane, formulation and pendulum hardness are set forth in the following table:

| Example | Unsaturated Polyurethane from Example | Number of Passes | Initial Pendulum Hardness (sec) | Pendulum Hardness after 1 day (sec) |
|---|---|---|---|---|
| 20 | 12 | 1 | 183 | 193 |
|  |  | 2 | 182 | 189 |
| 21 | 13 | 1 | 189 | 197 |
|  |  | 2 | 183 | 190 |
| 22 | 14 | 1 | 181 | 192 |
|  |  | 2 | 176 | 185 |
| 23 | 15 | 1 | 189 | 196 |
|  |  | 2 | 186 | 190 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An ethylenically unsaturated polyisocyanate which contains allophanate groups and has i) an NCO content of 5 to 25% by weight, ii) a content of β,γ-ethylenically unsaturated ether groups (calculated as C=C, MW 24) incorporated through allophanate groups of 0.5 to 15% by weight and iii) an allophanate group content (calculated as $N_2C_2HO_3$, MW 101) of 1 to 30%, wherein said ethylenically unsaturated polyisocyanate is prepared by allophanitizing the urethane group-containinq reaction product of an organic aliphatic diisocyanate with a β,γ-unsaturated ether alcohol, provided that when said organic diisocyanate is 1,6-hexamethylene diisocyanate, said unsaturated ether alcohol is not allyl alcohol.

2. The ethylenically unsaturated polyisocyanate of claim 1 wherein said organic diisocyanate comprises 1,6-hexamethylene diisocyanate.

3. The ethylenically unsaturated polyisocyanate of claim 1 wherein said β,γ-ethylenically unsaturated ether alcohol comprises a member selected from the group consisting of allyl alcohol, glycerol diallyl ether, trimethylol propane diallyl ether and pentaerythritol triallyl ether.

4. The ethylenically unsaturated polyisocyanate of claim 2 wherein said β,γ-ethylenically unsaturated ether alcohol comprises a member selected from the group consisting of glycerol diallyl ether, trimethylol propane diallyl ether and pentaerythritol triallyl ether.

5. The ethylenically unsaturated polyisocyanate of claim 2 wherein said β,γ-ethylenically unsaturated ether alcohol comprises trimethylol propane diallyl ether.

* * * * *